US012769074B2

(12) United States Patent
Varkey et al.

(10) Patent No.: US 12,769,074 B2
(45) Date of Patent: Oct. 20, 2026

(54) FIBER OPTIC ASSEMBLIES FOR COILED TUBING

(71) Applicant: Schlumberger Technology Corporation, Sugar Land, TX (US)

(72) Inventors: Joseph Varkey, Sugar Land, TX (US); Maria Grisanti, Sugar Land, TX (US); David Kim, Sugar Land, TX (US); Ian Mace, Sugar Land, TX (US); Tam Tran, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 279 days.

(21) Appl. No.: 18/659,709

(22) Filed: May 9, 2024

(65) Prior Publication Data

US 2025/0347879 A1 Nov. 13, 2025

(51) Int. Cl.
*G02B 6/44* (2006.01)
*G02B 6/42* (2006.01)

(52) U.S. Cl.
CPC ......... *G02B 6/4432* (2013.01); *G02B 6/4228* (2013.01)

(58) Field of Classification Search
None
See application file for complete search history.

(56) References Cited

U.S. PATENT DOCUMENTS

| | | | |
|---|---|---|---|
| 1,948,439 | A | 2/1934 | Budscheid |
| 1,973,091 | A | 9/1934 | Miller |
| 1,995,071 | A | 3/1935 | Mackenzie |
| 2,002,061 | A | 5/1935 | House |
| 2,003,001 | A | 5/1935 | Leece |
| 2,118,629 | A | 5/1938 | Waldron |
| 2,576,227 | A | 11/1951 | Hutchins, Jr. |
| 2,604,509 | A | 7/1952 | Blanchard |
| 3,115,542 | A | 12/1963 | Giuseppe |
| 3,127,083 | A | 3/1964 | Guyer |
| 3,217,083 | A | 11/1965 | Gore |

(Continued)

FOREIGN PATENT DOCUMENTS

| | | | |
|---|---|---|---|
| CA | 2244833 | A1 | 3/1999 |
| CN | 2755741 | Y | 2/2006 |

(Continued)

OTHER PUBLICATIONS

Extended Search Report issued in European Patent Application No. 22821076.1 dated Mar. 18, 2025, 8 pages.

(Continued)

*Primary Examiner* — Jerry Rahll
(74) *Attorney, Agent, or Firm* — Jeffrey D. Frantz

(57) ABSTRACT

In some embodiments, a tubing assembly can include a coiled tubing and a fiber optic assembly disposed within a flow path of the coiled tubing. The fiber optic assembly can include at least one optical fiber in a coupled electro-optical package. The at least one optical fiber can be in intimate contact with an enclosure of the coupled electro-optical package. The fiber optic assembly can also include an insulation layer disposed about the enclosure. The fiber optic assembly can also include a layer of helically wound metal (Continued)

strands disposed about the insulation layer. The fiber optic assembly can also include an outer metal layer disposed about the layer of helically wound metal strands.

20 Claims, 3 Drawing Sheets

(56) References Cited

U.S. PATENT DOCUMENTS 3,259,675 A 7/1966 Bowers
3,313,346 A 4/1967 Cross
3,328,140 A 6/1967 Warren
3,346,045 A 10/1967 Knapp
3,482,034 A 12/1969 Rhoades
3,490,125 A 1/1970 Frieling, Jr.
3,554,284 A 1/1971 Nystrom
3,567,879 A 3/1971 Dueker
3,573,349 A 4/1971 Bowers
3,634,607 A 1/1972 Coleman
3,679,812 A 7/1972 Owens
3,681,514 A 8/1972 Rhoades
3,710,859 A 1/1973 Hanes
3,758,704 A 9/1973 Naud
3,766,307 A 10/1973 Andrews
4,016,942 A 4/1977 Wallis, Jr.
4,059,951 A 11/1977 Roe
4,077,022 A 2/1978 Pitts, Jr.
4,131,757 A 12/1978 Felkel
4,131,758 A 12/1978 Felkel
4,197,423 A 4/1980 Fusen
4,250,351 A 2/1981 Bridges
4,259,544 A 3/1981 Litauer
4,281,716 A 8/1981 Hall
4,292,588 A 9/1981 Smith
4,409,431 A 10/1983 Neuroth
4,486,252 A 12/1984 Lloyd
4,522,464 A 6/1985 Thompson
4,523,804 A 6/1985 Thompson
4,525,813 A 6/1985 Burrage
4,547,774 A 10/1985 Gould
4,577,693 A 3/1986 Graser
4,606,604 A 8/1986 Soodak
4,644,094 A 2/1987 Hoffman
4,645,298 A 2/1987 Gartside, III
4,673,041 A 6/1987 Turner
4,675,474 A 6/1987 Neuroth
4,696,542 A 9/1987 Thompson
4,722,589 A 2/1988 Priaroggia
4,729,629 A 3/1988 Saito
4,743,711 A 5/1988 Hoffman
4,762,180 A 8/1988 Wybro
4,767,182 A 8/1988 Parfree
4,768,984 A 9/1988 de Oliveira
4,818,060 A 4/1989 Arroyo
4,825,953 A 5/1989 Wong
4,830,113 A 5/1989 Geyer
4,899,823 A 2/1990 Cobb
4,920,738 A 5/1990 White
4,952,012 A 8/1990 Stamnitz
4,979,795 A 12/1990 Mascarenhas
4,986,360 A 1/1991 Laky
4,993,492 A 2/1991 Cressey
5,002,130 A 3/1991 Laky
5,042,903 A 8/1991 Jakubowski
5,088,559 A 2/1992 Taliaferro
5,125,061 A 6/1992 Marlier
5,125,062 A 6/1992 Marlier
5,150,443 A 9/1992 Wijnberg
5,329,605 A 7/1994 Wargotz
5,339,378 A 8/1994 Simonds
5,431,759 A 7/1995 Neuroth
5,438,164 A 8/1995 Green
5,495,547 A 2/1996 Rafie
5,751,879 A 5/1998 Graham
5,778,981 A 7/1998 Head
5,787,217 A 7/1998 Traut
5,857,523 A 1/1999 Edwards
5,894,104 A 4/1999 Hedberg
5,930,431 A 7/1999 Lail
6,015,013 A 1/2000 Edwards
6,030,255 A 2/2000 Konishi
6,053,252 A 4/2000 Edwards
6,060,662 A 5/2000 Rafie
6,116,345 A 9/2000 Fontana
6,161,619 A 12/2000 Head
6,182,765 B1 2/2001 Kilgore
6,195,487 B1 2/2001 Anderson
6,211,467 B1 4/2001 Berelsman
6,276,456 B1 8/2001 Head
6,334,015 B2 12/2001 Jamet
6,374,023 B1 4/2002 Parris
6,386,290 B1 5/2002 Headworth
6,389,204 B1 5/2002 Hurley
6,392,151 B1 5/2002 Rafie
6,403,889 B1 6/2002 Mehan
6,442,304 B1 8/2002 Crawley
6,484,806 B2 11/2002 Childers
6,488,093 B2 12/2002 Moss
6,555,752 B2 4/2003 Dalrymple
6,559,383 B1 5/2003 Martin
6,559,385 B1 5/2003 Johnson
6,600,108 B1 7/2003 Mydur
6,631,095 B1 10/2003 Bryant
6,659,180 B2 12/2003 Moss
6,675,888 B2 1/2004 Schempf
6,691,775 B2 2/2004 Headworth
6,745,840 B2 6/2004 Headworth
6,747,213 B2 6/2004 Bonicel
6,763,889 B2 7/2004 Rytlewski
6,775,444 B1 8/2004 Hurley
6,776,195 B2 8/2004 Blasko
6,807,988 B2 10/2004 Powell
6,834,724 B2 12/2004 Headworth
6,843,321 B2 1/2005 Carlsen
6,919,512 B2 7/2005 Guven
6,922,512 B2 7/2005 Nechitailo
7,000,903 B2 2/2006 Piecyk
7,116,283 B2 10/2006 Benson
7,119,283 B1 10/2006 Varkey
7,139,218 B2 11/2006 Hall
7,170,007 B2 1/2007 Varkey
7,235,743 B2 6/2007 Varkey
7,282,644 B1 10/2007 Alvey
7,288,721 B2 10/2007 Varkey
7,326,854 B2 2/2008 Varkey
7,331,393 B1 2/2008 Hoel
7,402,753 B2 7/2008 Varkey
7,462,781 B2 12/2008 Varkey
7,465,876 B2 12/2008 Varkey
7,699,114 B2 4/2010 Ullah
7,700,880 B2 4/2010 Varkey
7,719,283 B2 5/2010 Ishikawa
7,730,936 B2 6/2010 Hernandez-Solis
7,793,409 B2 9/2010 Varkey
7,798,234 B2 9/2010 Ju
7,845,412 B2 12/2010 Sbordone
8,011,435 B2 9/2011 Carossino
8,218,925 B2 7/2012 Bohler
8,227,697 B2 7/2012 Varkey
8,387,701 B2 3/2013 Sbordone
8,413,723 B2 4/2013 Varkey
8,463,095 B2 * 6/2013 Bohler ................. G02B 6/4435
385/100
8,639,075 B1 1/2014 Burnett
8,807,225 B2 8/2014 Varkey
8,886,000 B2 11/2014 Register, III
8,901,425 B2 12/2014 Varkey
8,929,702 B2 1/2015 Varkey
8,960,271 B2 2/2015 Lahijani
8,969,726 B2 3/2015 Varkey
9,024,189 B2 5/2015 Basak
9,027,657 B2 5/2015 Varkey
9,058,921 B2 6/2015 Congdon
9,069,148 B2 6/2015 Herbst

(56) References Cited

U.S. PATENT DOCUMENTS

| | | | | |
|---|---|---|---|---|
| 9,091,154 | B2 | 7/2015 | Weerasinghe | |
| 9,182,303 | B2 | 11/2015 | Lowell | |
| 9,188,756 | B2 | 11/2015 | Register, III | |
| 9,229,187 | B2 * | 1/2016 | Cooke | G02B 6/44715 |
| 9,335,503 | B2 | 5/2016 | Kachmar | |
| 9,368,260 | B2 | 6/2016 | Varkey | |
| 9,412,492 | B2 | 8/2016 | Varkey | |
| 9,412,502 | B2 | 8/2016 | Magner | |
| 9,691,523 | B2 | 6/2017 | Pourladian | |
| 9,947,437 | B2 | 4/2018 | Li et al. | |
| 10,001,613 | B2 | 6/2018 | Varkey | |
| 10,049,789 | B2 | 8/2018 | Varkey | |
| 10,087,717 | B2 | 10/2018 | Varkey | |
| 10,215,939 | B1 | 2/2019 | Varkey | |
| 10,268,015 | B2 | 4/2019 | Sato | |
| 10,557,343 | B2 * | 2/2020 | Wilson | E21B 47/06 |
| 10,593,444 | B2 | 3/2020 | Schwartz | |
| 10,612,947 | B2 | 4/2020 | Kishida | |
| 11,268,329 | B2 | 3/2022 | Varkey | |
| 11,387,014 | B2 | 7/2022 | Varkey | |
| 2003/0011489 | A1 | 1/2003 | Viswanathan | |
| 2003/0082380 | A1 | 5/2003 | Hager | |
| 2003/0163179 | A1 | 8/2003 | Hoglund | |
| 2004/0109650 | A1 * | 6/2004 | Kim | G02B 6/4433 385/100 |
| 2004/0163822 | A1 | 8/2004 | Zhang | |
| 2004/0262027 | A1 | 12/2004 | Kaczmarski | |
| 2005/0063650 | A1 | 3/2005 | Castellani | |
| 2005/0217844 | A1 | 10/2005 | Edwards | |
| 2005/0219063 | A1 | 10/2005 | Viswanathan | |
| 2006/0018611 | A1 | 1/2006 | Maida | |
| 2006/0024842 | A1 | 2/2006 | Nylese | |
| 2006/0045442 | A1 | 3/2006 | Varkey | |
| 2006/0104579 | A1 | 5/2006 | Fitz | |
| 2006/0151194 | A1 | 7/2006 | Varkey | |
| 2006/0187084 | A1 | 8/2006 | Hernandez-Marti | |
| 2006/0211286 | A1 | 9/2006 | Shuey | |
| 2006/0221768 | A1 | 10/2006 | Hall | |
| 2006/0237217 | A1 | 10/2006 | Glew | |
| 2006/0237218 | A1 | 10/2006 | Glew | |
| 2006/0242824 | A1 | 11/2006 | Varkey et al. | |
| 2007/0000682 | A1 | 1/2007 | Varkey | |
| 2007/0003780 | A1 | 1/2007 | Varkey | |
| 2007/0044991 | A1 | 3/2007 | Varkey | |
| 2007/0059499 | A1 | 3/2007 | Yuasa | |
| 2007/0158095 | A1 | 7/2007 | Sridhar | |
| 2007/0196557 | A1 | 8/2007 | Weissman | |
| 2008/0031578 | A1 | 2/2008 | Varkey | |
| 2008/0083533 | A1 | 4/2008 | Malone | |
| 2008/0118209 | A1 | 5/2008 | Varkey | |
| 2008/0156517 | A1 | 7/2008 | Varkey | |
| 2008/0166093 | A1 | 7/2008 | Shinoski | |
| 2008/0190612 | A1 | 8/2008 | Buchanan | |
| 2008/0247717 | A1 | 10/2008 | Patlakh | |
| 2008/0247718 | A1 | 10/2008 | Dowd | |
| 2008/0267569 | A1 | 10/2008 | Ginocchio | |
| 2008/0289851 | A1 * | 11/2008 | Varkey | G02B 6/4416 385/102 |
| 2009/0034920 | A1 | 2/2009 | Dowd | |
| 2009/0038149 | A1 | 2/2009 | Varkey | |
| 2009/0046986 | A1 | 2/2009 | Maeda | |
| 2009/0089998 | A1 | 4/2009 | Varkey | |
| 2009/0194296 | A1 | 8/2009 | Gillan | |
| 2009/0194314 | A1 | 8/2009 | Varkey | |
| 2009/0283295 | A1 | 11/2009 | Varkey | |
| 2010/0038112 | A1 | 2/2010 | Grether | |
| 2010/0255186 | A1 | 10/2010 | Montes | |
| 2010/0260459 | A1 | 10/2010 | Bohler | |
| 2011/0075979 | A1 | 3/2011 | Ma | |
| 2011/0232936 | A1 | 9/2011 | Magner | |
| 2011/0293228 | A1 | 12/2011 | Keller | |
| 2012/0125596 | A1 | 5/2012 | Homa | |
| 2012/0222869 | A1 | 9/2012 | Varkey | |
| 2012/0257864 | A1 | 10/2012 | Consonni | |
| 2013/0026314 | A1 | 1/2013 | Hu et al. | |
| 2013/0227837 | A1 | 9/2013 | Varkey | |
| 2013/0343713 | A1 * | 12/2013 | Hayashishita | G02B 6/4434 385/103 |
| 2014/0212609 | A1 | 7/2014 | Stratton | |
| 2014/0352952 | A1 | 12/2014 | Varkey | |
| 2015/0094763 | A1 | 4/2015 | Ferragamo | |
| 2015/0233200 | A1 | 8/2015 | Varkey | |
| 2015/0294762 | A1 | 10/2015 | Varkey | |
| 2015/0348677 | A1 | 12/2015 | Pourladian | |
| 2016/0024902 | A1 | 1/2016 | Richter | |
| 2016/0025945 | A1 | 1/2016 | Wanjau | |
| 2016/0222736 | A1 | 8/2016 | Varkey | |
| 2016/0329128 | A1 | 11/2016 | Varkey | |
| 2017/0268304 | A1 | 9/2017 | Varkey | |
| 2017/0358385 | A1 * | 12/2017 | Varkey | H01B 13/0036 |
| 2018/0025884 | A1 | 1/2018 | Flitsch | |
| 2018/0073310 | A1 | 3/2018 | Varkey | |
| 2018/0137953 | A1 * | 5/2018 | Varkey | G02B 6/4416 |
| 2018/0252884 | A1 | 9/2018 | Quinn | |
| 2018/0366240 | A1 | 12/2018 | Varkey | |
| 2019/0064459 | A1 | 2/2019 | Varkey | |
| 2019/0101715 | A1 | 4/2019 | Hudson, II | |
| 2019/0170955 | A1 | 6/2019 | Varkey | |
| 2019/0279786 | A1 | 9/2019 | Varkey | |
| 2020/0081209 | A1 | 3/2020 | Martin Regalado | |
| 2020/0123866 | A1 | 4/2020 | Varkey | |
| 2020/0126691 | A1 | 4/2020 | Varkey | |
| 2020/0285011 | A1 | 9/2020 | Lang | |
| 2021/0055475 | A1 | 2/2021 | Varkey | |
| 2022/0199293 | A1 * | 6/2022 | Stevens | H01B 7/2825 |
| 2023/0393358 | A1 * | 12/2023 | Kishida | G02B 6/4415 |

FOREIGN PATENT DOCUMENTS

| | | | |
|---|---|---|---|
| CN | 201327731 | Y | 10/2009 |
| CN | 201413731 | Y | 2/2010 |
| CN | 101726814 | A | 6/2010 |
| CN | 101876733 | A | 11/2010 |
| CN | 202487261 | U | 10/2012 |
| CN | 103502864 | A | 1/2014 |
| CN | 103620465 | A | 3/2014 |
| CN | 104914541 | A | 9/2015 |
| CN | 204882979 | U | 12/2015 |
| CN | 205542137 | U | 8/2016 |
| CN | 106537210 | A | 3/2017 |
| CN | 106716209 | A | 5/2017 |
| CN | 109116494 | A | 1/2019 |
| CN | 208444062 | | 1/2019 |
| CN | 109581605 | A | 4/2019 |
| CN | 208767077 | | 4/2019 |
| EP | 0003104 | A1 | 7/1979 |
| EP | 471600 | A1 | 2/1992 |
| EP | 0996014 | A1 | 4/2000 |
| EP | 1216342 | A1 | 6/2002 |
| EP | 2039878 | A1 | 3/2009 |
| EP | 3108098 | A1 | 12/2016 |
| EP | 3250785 | A1 | 12/2017 |
| FR | 2767861 | A1 | 3/1999 |
| GB | 2234772 | A | 2/1991 |
| JP | 54007186 | | 1/1979 |
| JP | H0195834 | A | 4/1989 |
| JP | 2216710 | | 8/1990 |
| JP | H08508829 | A | 9/1996 |
| JP | H10104482 | A | 4/1998 |
| JP | H10170778 | A | 6/1998 |
| JP | 2002243999 | A | 8/2002 |
| JP | 2003151375 | A | 5/2003 |
| JP | 2017134267 | A | 8/2017 |
| KR | 20000046916 | A | 7/2000 |
| KR | 20120026938 | A | 3/2012 |
| WO | 9948111 | A1 | 9/1999 |
| WO | 0125593 | A1 | 4/2001 |
| WO | 02071178 | A2 | 9/2002 |
| WO | 2006003362 | A1 | 1/2006 |
| WO | 2006027553 | A1 | 3/2006 |
| WO | 2006088372 | A1 | 8/2006 |
| WO | 2007034242 | A1 | 3/2007 |
| WO | 2008132637 | A1 | 11/2008 |
| WO | 2011037974 | A2 | 3/2011 |

(56) References Cited

FOREIGN PATENT DOCUMENTS

| | | | |
|---|---|---|---|
| WO | 2013017906 | A1 | 2/2013 |
| WO | 2020264494 | A1 | 12/2020 |
| WO | 2020264498 | A1 | 12/2020 |
| WO | 2022261390 | A1 | 12/2022 |

OTHER PUBLICATIONS

Notice of Allowance issued in U.S. Appl. No. 17/806,278 dated Feb. 27, 2025, 9 pages.
Office Action issued in U.S. Appl. No. 17/621,094 dated Oct. 28, 2024, 50 pages.
Third Office Action issued in Chinese Patent Application No. 2020800575714 dated Oct. 18, 2024, 20 pages with English translation.
Exam Report issued in UAE Patent Application No. P6002391/2021 dated Oct. 11, 2024, 7 pages.
Office Action issued in U.S. Appl. No. 17/621,094 dated Mar. 31, 2025 29 pages.
Examination Report issued n the related CA application 2774775, dated Aug. 16, 2016, (3 pages).
Lebedev, et al., "The breakdown Strength of two-layer dlielectrics", High Voltage Engineering, 1999. Eleventh International Symposium, Conf. Publ. No. 467, vol. 4, Aug. 22-27, 1999, pp. 304-307.
Salama, et al., "Instructional design of multi-layer insulation of power cabels". Power Systems, IEEE Transations, vol. 7, Issue 1, Feb. 1992, pp. 377-382.
International Search Report and Written Opinion issued in the related PCT application PCT/US2010/049783, dated May 9, 2011 (7 pages).
International Preliminary Report on Patentability issued in the related PCT application PCT/US2010/049783, dated Mar. 22, 2012 (5 pages).
Examination Report issued in the related AU application 2010298356, dated Oct. 19, 2015, (3 pages).
Office Action issued in the related MX application MX/a/2012/003397, dated Jun. 30, 2015 (5 pages).
International Search Report and Written Opinion issued in the related PCT application PCT/US2010/031218, dated Nov. 17, 2010 (6 pages).
International Preliminary Report on Patentability issued in the related PCT application PCT/US2010/031218, (25.0470- WO-PCT), dated Oct. 18, 2011 (4 pages).
Examination Report issued in the related AU application 2010236397, dated Apr. 22, 2015, (15 pages).
Extended Search Report issued in the related EP Application 10765176.2, dated Mar. 23, 2015 (7 pages).
Office Action issued in the related EP Application 10765176.2, dated Nov. 24, 2017 (6 pages).
Extended European Search Report issued in the related EP Application 117933206.1, dated Nov. 28, 2014 (11 pages).
International Search Report and Written Opinion issued in the related PCT application PCT/US2011/039879, dated Jan. 16, 2012 (9 pages).
International Preliminary Report on Patentability issued in the related PCT application PCT/US2011/039879, dated Dec. 20, 2012 (8 pages).
Office Action issued in the related MX application MX/a/2012/013746, dated Aug. 23, 2013, (4 pages).
EP Communication Article 94-3 issued in the related EP Application 117933206.1, dated Dec. 6, 2016 (8 pages).
Examination Report issued in the related CA application 2799642, dated Mar. 13, 2017 (4 pages).
Examination Report issued in the related AU Application 2011236038, dated Jul. 28, 2015 (3 pages).
Office Action issued in the related MX application MX/a/2011/010863, dated Jan. 29, 2014, (8 pages).
Examination Report issued in the related CA application 2755231, dated Aug. 1, 2017 (5 pages).
Office Action issued in the related U.S. Appl. No. 16/113,705 dated Sep. 11, 2019 (32 pages).
Office Action issued in the related Brazil Patent Application No. PI1011343.6 dated Oct. 30, 2019, 6 pages with English translation.
Office Action issued in the related U.S. Appl. No. 16/113,705 dated Sep. 29, 2020, 13 pages.
Office Action issued in the related U.S. Appl. No. 16/724,450 dated Mar. 30, 2021, 39 pages.
First Examination report issued in Saudi Arabia patent application 120420323 on Feb. 2, 2022 (8 pages with translation).
Office Action received in NO application 20073677, dated Oct. 15, 2015 (6 pages with translation).
Examination Report issued in AU Application 2006205539, dated May 24, 2010 (2 pages).
Examination Report issued in CA Application 2594393, dated Apr. 12, 2011 (4 pages).
Office Action issued in the EP Application 06701794.7, dated Dec. 13, 2007 (2 pages).
Examination Report issued in IN Application 3079/CHENP/2007, dated May 24, 2012 (1 page).
Office Action issued in U.S. Appl. No. 16/724,450 dated Mar. 31, 2022, 22 pages.
First Office Action issued in Chinese Patent Application 201907963934 dated May 23, 2022, 13 pages with English translation.
Second Exam Report issued in Saudi Arabian Patent Application 120420323 dated Jun. 30, 2022, 14 pages with English translation.
Office Action issued in U.S. Appl. No. 16/724,450 dated Nov. 7, 2022, 23 pages.
Office Action issued in Mexico Patent Application No. MX/a/2019/010220 dated Apr. 13, 2023, 7 pages with English translation.
International Search Report and Written Opinion issued in International Patent application PCT/US2020/040118 on Oct. 15, 2020, 10 pages.
International Preliminary Report on Patentability issued in International Patent application PCT/US2020/040118, dated Jan. 6, 2022, 7 pages.
International Search Report and Written Opinion issued in International Patent application PCT/US2020/040123 on Oct. 15, 2020, 10 pages.
International Preliminary Report on Patentability issued in International Patent application PCT/US2020/040123, dated Jan. 6, 2022, 7 pages.
Exam Report issued in United Kingdom Patent Application No. GB2118164.9 dated Oct. 27, 2022, 2 pages.
Office Action issued in U.S. Appl. No. 17/621,094 dated Jan. 27, 2023, 10 pages.
JPH0195834A English translation (Year: 1989).
Office Action issued in U.S. Appl. No. 17/621,094 dated May 15, 2023, 10 pages.
Office Action issued in U.S. Appl. No. 17/621,094 dated Nov. 9, 2023, 11 pages.
First Office Action issued in China Patent Application No. 2020800475714 dated Nov. 28, 2023, 23 pages with English translation.
First Office Action issued in China Patent Application No. 2020800460615 dated Jan. 4, 2024, 20 pages with English translation.
Office Action issued in U.S. Appl. No. 17/806,278 on Oct. 31, 2024, 27 pages.
H. Ku, H. Wang, N. Pattarachaiyakoop, M. Trada, "A review on the tensile properties of natural fiber reinforced polymer composites", Composites Part 8: Engineering, vol. 42, Issue 4, 2011, pp. 856-873, doi: 10.1016/j.compositesb.2011.01.010, 18 pages. (Year: 2011).
Office Action issued in U.S. Appl. No. 17/806,278 dated Dec. 23, 2024, 32 pages.
First Examination Report issued in Saudi Arabia Patent Application No. 523451782, Dated Aug. 29, 2024, 13 pages with English translation.
Final Office Action issued in U.S. Appl. No. 17/806,278 dated Aug. 7, 2024, 22 pages.
Office Action issued in U.S. Appl. No. 17/621,144 dated Sep. 5, 2024, 18 pages.

(56) References Cited

OTHER PUBLICATIONS

First Office Action issued in Chinese Patent Application 202011534351.2 dated Jan. 22, 2025, 22 pages with English translation.
Office Action issued in U.S. Appl. No. 17/621,144 dated Apr. 11, 2024, 46 pages.
Examination Report under section 18(3) issued in United Kingdom Patent Application No. GB2118161.5 dated Apr. 19, 2024, 2 pages.
Office Action issued in U.S. Appl. No. 17/621,094 dated Apr. 26, 2024, 16 pages.
International Search Report and Written Opinion issued in International Patent application PCT/US2022/032932 on Oct. 4, 2022, 10 pages.
Nowak, Gerhard, "Computer design of electromechanical cables for ocean applications," in Proceedings of Tenth Annual Marine Technology Society Conference, Washington, DC, 1974, pp. 293-305.
Office Action issued in U.S. Appl. No. 17/621,144 dated Jul. 2, 2024, 10 pages.
Office Action issued in U.S. Appl. No. 17/806,278 dated Jun. 5, 2024, 24 pages.

* cited by examiner

FIBER OPTIC ASSEMBLIES FOR COILED TUBING

FIELD

Embodiments described generally relate to fiber optic assemblies for coiled tubing. More particularly, such embodiments relate to tubing assemblies that include a fiber optic assembly disposed within a flow path of a coiled tubing.

BACKGROUND

Conventional coiled tubing intervention services use optical fibers in metal tubes (FIMT) for distributed measurements and optical telemetry. The optical fibers are loosely disposed within the tube and excess fiber length (EFL) is packaged inside the tube to prevent the optical fibers from being subjected to excessive strain when the FIMT is subjected to the effects of thermal expansion and/or loads such as tension.

There are numerous disadvantages associated with the current FIMT designs. For example, when a FIMT cable includes multiple optical fibers, the differences in EFL cause optical fiber length differences that are generally greater than 20 m to about 30 m per 9,150 m of cable, which can cause serious errors when sensing measurements require a high degree of length or depth accuracy. The EFL can also cause non-linearities in the loss vs. signal length slope, optical attenuation and EFL are highly sensitive to tension variations brought about by the manufacturing process. Another disadvantage to FIMT designs is that the FIMT can be easily flooded in the event of a seal failure at a terminated end. The optical fibers in the FIMT also have a less than desirable signal to noise ratio in sensing measurements. Another disadvantage is that if the FIMT requires weld repair the optical fibers are susceptible to being damaged.

There is a need, therefore, for improved tubing assemblies that include at least one optical fiber.

SUMMARY

Tubing assemblies are provided. In some embodiments, the tubing assembly can include a coiled tubing and a fiber optic assembly disposed within a flow path of the coiled tubing. The fiber optic assembly can include at least one optical fiber in a coupled electro-optical package. The at least one optical fiber can be in intimate contact with an enclosure of the coupled electro-optical package. An insulation layer can be disposed about the enclosure. A layer of helically wound metal strands can be disposed about the insulation layer. An outer metal layer can be disposed about the layer of helically wound metal strands.

In other embodiments, the tubing assembly can include a coiled tubing and a fiber optic assembly disposed within a flow path of the coiled tubing. The fiber optic assembly can include at least one optical fiber in a coupled optical package. The at least one optical fiber can be in intimate contact with an enclosure of the coupled optical package. An outer metal layer can be disposed about the enclosure.

BRIEF DESCRIPTION OF THE DRA WINGS

The subject disclosure is further described in the detailed description which follows, in reference to the noted plurality of drawings by way of non-limiting examples of the subject disclosure, in which like reference numerals represent similar parts throughout the several views of the drawings.

DETAILED DESCRIPTION

Figure 1A:
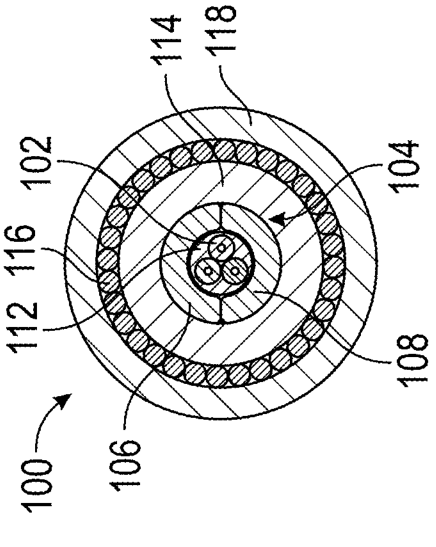
FIGS. 1A-1F depict illustrative, fiber optic assemblies that include at least one optical fiber in a coupled electro-optical package, according to one or more embodiments described.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions can be made to achieve certain goals, such as compliance with system-related and/or operation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the claimed subject matter are discussed below. These examples are not intended to limit the scope of the disclosure. Indeed, the present disclosure may encompass a variety of forms that may be similar to or different from the examples set forth below.

It should be understood that the formation of a first feature about, over, or on a second feature in the description that follows includes embodiments in which the first and second features are formed in direct contact and also includes embodiments in which additional features are formed interposing the first and second features, such that the first and second features are not in direct contact or directly adjacent to one another. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

When introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features. Furthermore, the phrase A “based on” B is intended to mean that A is at least partially based on B. Moreover, unless expressly stated otherwise, the term “or” is intended to be inclusive (e.g., logical OR) and not exclusive (e.g., logical XOR). In other words, the phrase A "or" B is intended to mean A, B, or both A and B.

Overview

Tubing assemblies are provided. The tubing assembly can include a coiled tubing and a fiber optic assembly disposed within a flow path defined by the coiled tubing. The fiber optic assembly can include at least one optical fiber in a coupled electro-optical package. In such embodiment, the at least one optical fiber can be in intimate contact with an enclosure of the coupled electro-optical package. In some embodiments, the fiber optic assembly can also include one or more insulation layers disposed about the enclosure, one or more layers of helically wound metal strands disposed about the insulation layer, and an outer metal layer disposed about the layer of helically wound metal strands. In some embodiments, the fiber optic assembly can optionally include one or more inner layer of helically wound metal strands disposed between the enclosure and the one or more insulation layers. In other embodiments, the fiber optic assembly can optionally include one or more layers of metallic and/or thermoplastic tape disposed between the enclosure and the one or more insulation layers. In still other embodiments, the fiber optic assembly can optionally include one or more layers of helically wound synthetic fibers disposed between the enclosure and the one or more insulation layers.

In other embodiments, the fiber optic assembly can include an outer metal layer disposed about the enclosure of the coupled electro-optical package. In some embodiments, the outer metal layer can be adjacent to and in direct contact with an outer surface of the enclosure. In such embodiment, the fiber optic assembly can be free of any insulation layer, any layer of helically wound metal strands, or any other layer disposed between the outer metal layer and the enclosure of the coupled optical package. In other embodiments, the fiber optic assembly can include one or more layers of helically wound metal strands disposed between the enclosure and the outer metal layer. In still other embodiments, the fiber optic assembly can include one or more layers of metallic and/or thermoplastic tape disposed between the enclosure and the outer metal layer. In yet other embodiments, the fiber optic assembly can include one or more layers of helically wound synthetic fibers disposed between the enclosure and the outer metal layer.

In some embodiments, the fiber optic assembly can include 1, 2, 3, 4, or more optical fibers in the coupled electro-optical package. In some embodiments, when the fiber optic assembly includes two or more optical fibers, the optical fibers can be stranded together in a helix with respect to one another. Stranding two or more optical fibers into the helix can be accomplished via an accurate lay-length control process so that the length of each of the two or more optical fibers is substantially the same. In some embodiments, when the fiber optic assembly includes two or more optical fibers, the length of each of the two or more optical fibers can be less than 20 m, less than 18 m, less than 16 m, less than 14 m, less than 12 m, less than 10 m, less than 8 m, less than 7 m, less than 6 m, less than 5 m, less than 4 m, less than 3 m, less than 2 m, less than 1 m, less than 0.9 m, less than 0.8 m, less than 0.7 m, less than 0.6 m, less than 0.5 m, less than 0.4 m, less than 0.3 m, less than 0.2 m, or less than 0.1 m with respect to one another per 9,150 m of the fiber optic assembly.

Any commercially available optical fiber(s) can be used. The optical fiber(s) can be single-mode fibers and/or multi-mode fibers, which can be either coated or uncoated. In some embodiments, the optical fiber(s) can be or can include, but are not limited to, silica fibers, acrylate fibers, polyimide fibers, or silicone perfluoroalkoxy (PFA) fibers. In some embodiments, the optical fibers can include one or more layers disposed about a fiber optic core that can be configured to transmit light. In some embodiments, a cladding layer can be disposed about the core that can confine the light to the core. In some embodiments, an outer layer can be disposed about the core or, if present, about the cladding layer that can protect the core and, if present, the cladding layer. In some embodiments, the cladding layer and/or the outer layer can be or can include one or more materials as is well-known in the art. For example, the cladding layer can be or can include one or more fluorinated polymers and the outer layer can be or can include acrylate polymers, polyimide polymers, silicone, carbon, and/or polyetheretherketone polymers. In some embodiments, the outer layer, if included, can allow at least partial embedment of the enclosure disposed thereabout into the outer layer, e.g., when the enclosure includes two or more shaped metal wires as further described below that can be served around the optical fibers.

In some embodiments, the enclosure can be a tube, an assembly of two or more components, or other similar enclosure. In some embodiments, the enclosure can be a metal tube. In other embodiments, the enclosure can include two or more shaped metal wires arranged about the at least one optical fiber. For example, the two or more shaped metal wires can have a keystone-shaped or wedge cross-section that can form the enclosure of the electro-optical package. In some embodiments, when the outer metal layer is adjacent to the enclosure and the enclosure includes two or more shaped metal wires arranged about the at least one optical fiber, an outer radius of each of the two or more shaped metal wires can be sufficient to facilitate pressure testing of the outer metal layer. In some embodiments, the metal tube and/or the shaped metal wires can be or can include one or more metals and/or metal alloys. In some embodiments, the metal can be or can include, but is not limited to, copper, copper-covered steel, beryllium-copper based alloys, nickel-chromium based alloys, superaustenitic stainless steel alloys, nickel-cobalt based alloys, copper-nickel-tin based alloys, nickel-molybdenum-chromium based alloys, tinned copper, aluminum, nickel, silver, copper-covered aluminum, other metal conductors, other metal alloy conductors, and combinations thereof.

When the optical fiber(s) is in a coupled electro-optical package, a gap (on each side) between the optical fiber(s) (outer surface of a buffer jacket or single or multi-optical fiber microbundle) and the enclosure (inner surface) can be from zero to 0.004" or the gap (cumulative, i.e., a sum of the gaps on opposing sides of the optical fiber(s)) can be from zero to 0.008", the optical fiber(s) is considered to be in a coupled structure or coupled electro-optical package. Optical fibers in a coupled electro-optical package are further described in WO Publication No. WO 2020/264498, which is incorporated by reference herein.

In some embodiments, the insulation layer(s) can be disposed about the enclosure, the optional inner layer(s) of helically wound metal strands if disposed about the enclosure, the optional layer(s) of metallic and/or thermoplastic tape if disposed about the enclosure, or the optional layer(s) of helically wound synthetic fibers if disposed about the enclosure. The insulation layer can insulate an electrical charge in the coupled electro-optical package and if present the optional inner layer(s) of helically wound metal strands disposed about the enclosure or if present the optional layer(s) of metallic tape disposed about the enclosure. In some embodiments, fiber optic assembly can include one, two, three, four, or more insulation layers. When the fiber optic assembly includes two or more insulation layers, each layer can have the same composition or different compositions with respect to one another.

In some embodiments, the insulation layer(s) can be or can include any insulating material such as a polymer or other material commonly used for insulating electric conductors. Examples of insulating materials can be or can include, but are not limited to, rubber, vulcanized rubber (VIR), polyethylene (PE), cross-linked polyethylene (XLPE), ethylene propylene rubber (EPR), asbestos, thermoplastic, varnished cambric material, impregnated paper, polyvinyl chloride (PVC), other low conductive materials, or any mixture or combination thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any mixture or combination thereof.

In some embodiments, the one or more layers of helically wound metal strands disposed about the insulation layer(s) and, if present, the optional inner layer(s) of helically wound metal strands disposed between the enclosure and the insulation layer(s) can be made from any suitable metal or metal alloy. The metal strands in the layer(s) of the helically wound metal strands and/or the optional inner layer(s) of the helically wound metal strands can be solid wires, stranded wires, or a combination of both solid and stranded wires. In some embodiments, stranded wires can include two, three, four, five, six, seven, eight, nine, ten, or more individual strands helixed together at a suitable lay angle to form one of the metal strands. In some embodiments, fiber optic assembly can include one, two, three, four, or more layers of helically wound metal strands disposed about the insulation layer(s) and, if present, one, two, three, four, or more inner layers of helically wound metal strands disposed between the enclosure and the insulation layer(s).

In some embodiments, the layer(s) of helically wound metal strands and, if present, the optional inner layer(s) of helically wound metal strands can be or can include, but is not limited to, copper, copper-covered steel, beryllium-copper based alloys, nickel-chromium based alloys, superaustenitic stainless steel alloys, nickel-cobalt based alloys, copper-nickel-tin based alloys, nickel-molybdenum-chromium based alloys, tinned copper, aluminum, nickel, silver, copper-covered aluminum, other metal conductors, other metal alloy conductors, and combinations thereof. When the fiber optic assembly includes the two or more layers of helically wound metal strands and/or the optional inner layer(s) of helically wound metal strands, each layer can be made from the same metal or same combination of metals or different metals or different combinations of metals with respect to one another.

In some embodiments, the outer metal layer disposed about the layer of helically wound metal strands or the outer metal layer disposed about the enclosure can be a metal tube. In other embodiments, the outer metal layer can be formed by disposing a metal cladding about the layer of helically wound metal strands or by disposing a metal cladding about the enclosure, welding the cladding, and the welded cladding can be drawn around the layer of helically wound metal strands or the enclosure to couple the metal cladding to the rest of the fiber optic assembly. In some embodiments, the outer metal layer can be or can include, but is not limited to, copper, copper-covered steel, beryllium-copper based alloys, nickel-chromium based alloys, superaustenitic stainless steel alloys, nickel-cobalt based alloys, copper-nickel-tin based alloys, nickel-molybdenum-chromium based alloys, tinned copper, aluminum, nickel, silver, copper-covered aluminum, other metal conductors, other metal alloy conductors, and combinations thereof.

In some embodiments, the layer(s) of helically wound metal strands that can be disposed about the insulation layer or the enclosure can allow for pressure testing to ensure the outer metal layer is free of pinholes or other openings by applying a gas, e.g., nitrogen, to the inside or outside of the fiber optic assembly. The layer(s) of helically wound metal strands that can be disposed about the insulation layer(s) or the enclosure can also provide protection to the layer(s) of insulation and/or the enclosure during welding of the metal cladding (if used) to form the outer metal layer and/or during a weld repair process.

The optional layer(s) of metallic and/or thermoplastic tape that can be disposed between the enclosure and the insulation layer(s) or between the enclosure and the outer metal layer can be helically wound about the enclosure. In some embodiments, the fiber optic assembly can include one, two, three, four, or more layers of metallic and/or thermoplastic tape. When the fiber optic assembly includes two or more layers of metallic and/or thermoplastic tape, each layer can have the same composition or different compositions with respect to one another. Suitable metallic tapes can be or can include, but are not limited to, tapes that include copper, copper-covered steel, beryllium-copper based alloys, nickel-chromium based alloys, superaustenitic stainless steel alloys, nickel-cobalt based alloys, copper-nickel-tin based alloys, nickel-molybdenum-chromium based alloys, tinned copper, aluminum, nickel, silver, copper-covered aluminum, other metal conductors, other metal alloy conductors, and combinations thereof. Suitable thermoplastic tapes can be or can include, but are not limited to, tapes that include polyethylene, polypropylene, ethyl vinyl acetate, polyetheretherketone (PEEK), polyetherketoneketone (PEKK), polyaryletherketone (PAEK), polyetherimide (PEI) and polyphenylene sulfide (PPS), or any combination thereof. In some embodiments, the thermoplastic tape can be reinforced with fibers, e.g., carbon fibers, glass fibers, metal fibers, or a combination thereof.

In some embodiments, the optional layer(s) of helically wound synthetic fibers that can be disposed between the enclosure and the insulation layer(s) or between the enclosure and the outer metal layer can include any suitable synthetic fiber or combination of synthetic fibers. Suitable synthetic fibers can be or can include, but are not limited to, glass fibers, ceramic fibers, carbon fibers, polyester fibers, polyamide fibers, aromatic co-polyamide fibers, para-aramid synthetic fibers, meta-aramid synthetic fibers, polytetrafluoroethylene fibers, or any combination thereof. In some embodiments, fiber optic assembly can include one, two, three, four, or more layers of helically wound synthetic fibers. When the fiber optic assembly includes two or more helically wound synthetic fibers, each layer can have the same composition or different compositions with respect to one another.

In some embodiments, the enclosure can optionally include a filler material disposed therein. In such embodiment, the filler material can fill at least a portion of any interstitial space located between the outer surface of the optical fiber(s) and the inner surface of the enclosure. In some embodiments, the filler material can be or can include, but is not limited to, silicone, ethylene propylene diene monomer rubber, a fluorosilicone, or a mixture thereof.

FIG. 1A depicts an illustrative fiber optic assembly 100 that includes at least one optical fiber 102 (three are shown) in a coupled electro-optical package 104, according to one or more embodiments. As shown, the coupled electro-optical package 104 can include a first keystone-shaped metal wire 106 and a second keystone shaped metal wire 108 that can form the enclosure 106/108 of the coupled electro-optical package 104. In some embodiments, a filler material 112 can optionally be disposed between the optical fiber(s) 102 and the enclosure 106/108. One or more insulation layers 114 can be disposed about the coupled electro-optical package 104. One or more layers of helically wound metal strands 116 can be disposed about the insulation layer(s) 114. An outer metal layer 118 can be disposed about the layer(s) of helically wound metal strands 116.

Figure 1B:
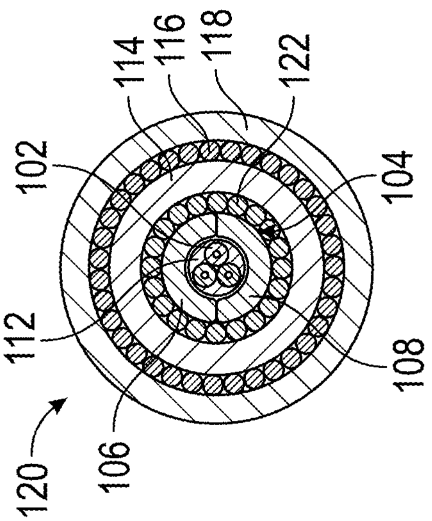

FIG. 1B depicts an illustrative fiber optic assembly 120 that includes at least one optical fiber 102 (three are shown) in the coupled electro-optical package 104, according to one or more embodiments. As shown, the coupled electro-optical package 104 can include the first and second keystone-shaped metal wires 106 and 108 that can form the enclosure 106/108 of the coupled electro-optical package 104. In some embodiments, the filler material 112 can optionally be disposed between the optical fiber(s) 102 and the enclosure 106/108. One or more inner layers of helically wound metal strands 122 can be disposed between the enclosure 106/108 and the insulation layer(s) 114. The one or more layers of helically wound metal strands 116 can be disposed about the insulation layer(s) 114. The outer metal layer 118 can be disposed about the layer(s) of helically wound metal strands 116.

Figure 1C:
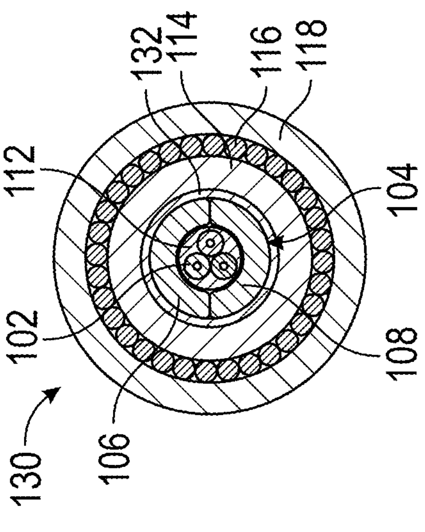

FIG. 1C depicts an illustrative fiber optic assembly 130 that includes at least one optical fiber 102 (three are shown) in the coupled electro-optical package 104, according to one or more embodiments. As shown, the coupled electro-optical package 104 can include the first and second keystone-shaped metal wires 106 and 108 that can form the enclosure 106/108 of the coupled electro-optical package 104. In some embodiments, the filler material 112 can optionally be disposed between the optical fiber(s) 102 and the enclosure 106/108. One or more layers of metallic and/or thermoplastic tape 132 can be disposed between the enclosure 106/108 and the insulation layer(s) 114. The one or more layers of helically wound metal strands 116 can be disposed about the insulation layer(s) 114. The outer metal layer 118 can be disposed about the layer(s) of helically wound metal strands 116.

Figure 1D:
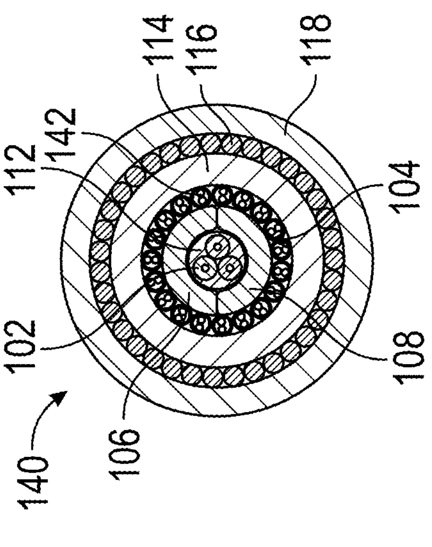

FIG. 1D depicts an illustrative fiber optic assembly 140 that includes at least one optical fiber 102 (three are shown) in the coupled electro-optical package 104, according to one or more embodiments. As shown, the coupled electro-optical package 104 can include the first and second keystone-shaped metal wires 106 and 108 that can form the enclosure 106/108 of the coupled electro-optical package 104. In some embodiments, the filler material 112 can optionally be disposed between the optical fiber(s) 102 and the enclosure 106/108. One or more layers of helically wound synthetic fibers 142 can be disposed between the enclosure 106/108 and the insulation layer(s) 114. The one or more layers of helically wound metal strands 116 can be disposed about the insulation layer(s) 114. The outer metal layer 118 can be disposed about the layer(s) of helically wound metal strands 116.

Figure 1E:
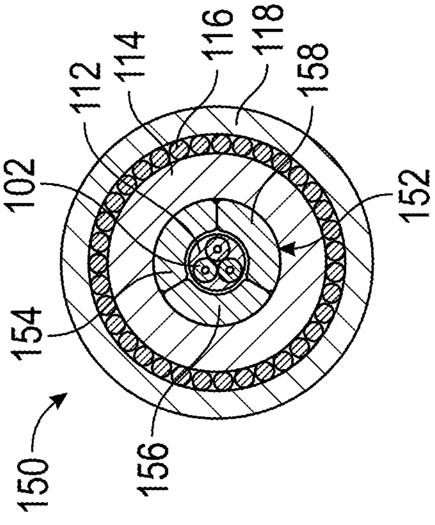

FIG. 1E depicts an illustrative fiber optic assembly 150 that includes at least one optical fiber 102 (three are shown) in a coupled electro-optical package 152, according to one or more embodiments. As shown, the coupled electro-optical package 152 can include a first keystone-shaped metal wire 154, a second keystone-shaped metal wire 156, and a third keystone-shaped metal wire 158 that can form an enclosure 154/156/158 of the coupled electro-optical package 152. In some embodiments, the filler material 112 can optionally be disposed between the optical fiber(s) 102 and the enclosure 154/156/158. The one or more insulation layers 114 can be disposed about the coupled electro-optical package 152. The one or more layers of helically wound metal strands 116 can be disposed about the insulation layer(s) 114. The outer metal layer 118 can be disposed about the layer(s) of helically wound metal strands 116.

Figure 1F:
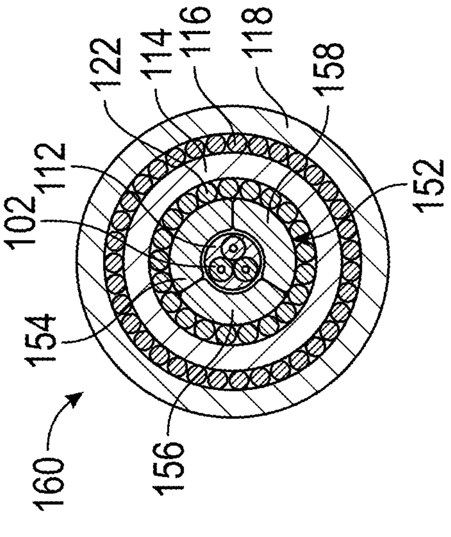

FIG. 1F depicts an illustrative fiber optic assembly 160 that includes at least one optical fiber 102 (three are shown) in the coupled electro-optical package 152, according to one or more embodiments. As shown, the coupled electro-optical package 152 can include the first, second, and third keystone-shaped metal wires 154, 156, and 158 that can form the enclosure 154/156/158 of the coupled electro-optical package 152. In some embodiments, the filler material 112 can optionally be disposed between the optical fiber(s) 102 and the enclosure 154/156/158. The one or more inner layers of helically wound metal strands 122 can be disposed between the enclosure 154/156/158 and the insulation layer (s) 114. The one or more layers of helically wound metal strands 116 can be disposed about the insulation layer(s) 114. The outer metal layer 118 can be disposed about the layer(s) of helically wound metal strands 116.

Figures 2A, 2B, 2C, 2D, 2E, 2F:
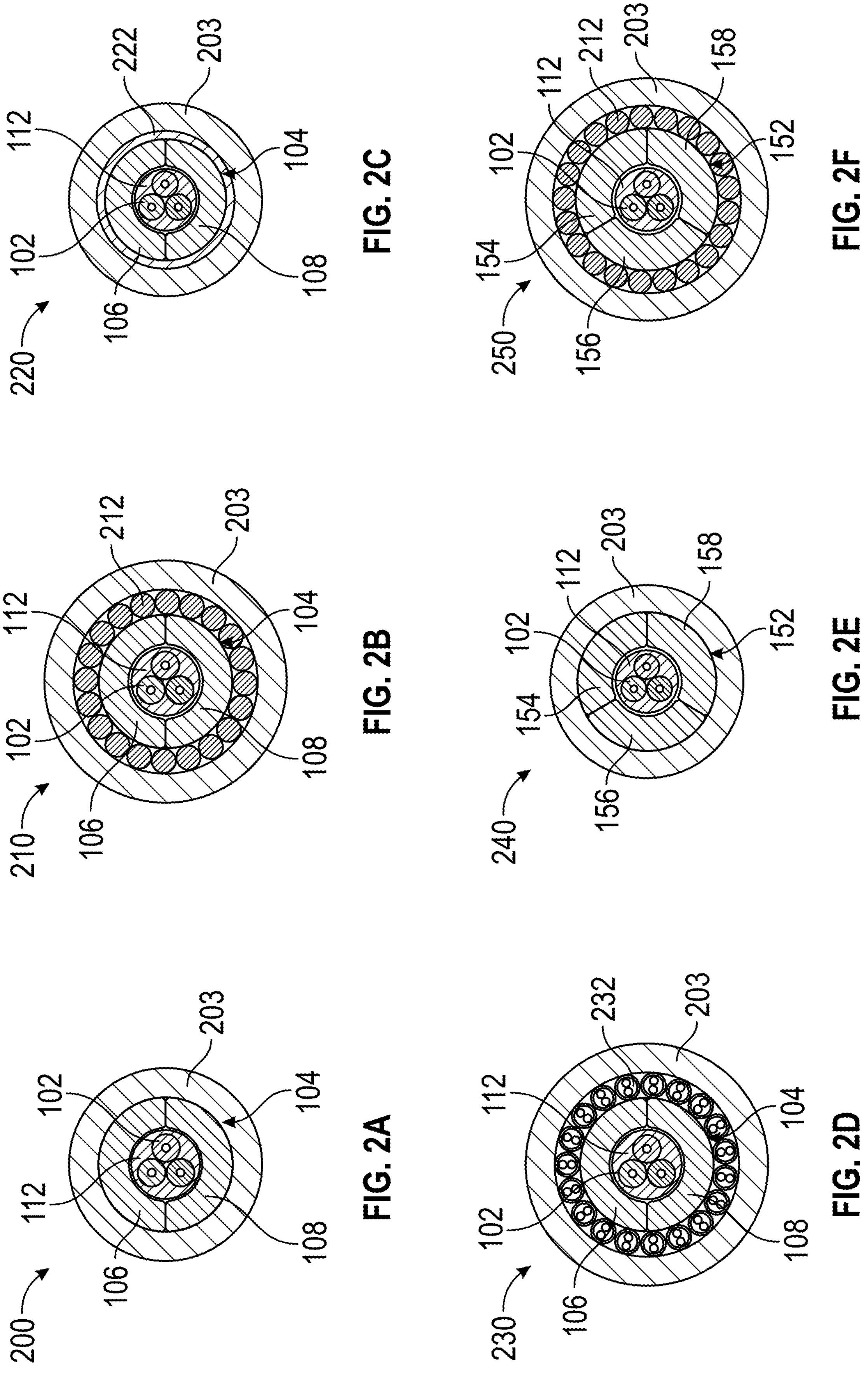
FIGS. 2A-2F depict additional illustrative fiber optic assemblies that include at least one optical fiber in a coupled optical package, according to one or more embodiments described.

FIG. 2A depicts an illustrative fiber optic assembly 200 that includes at least one optical fiber 102 (three are shown) in the coupled electro-optical package 104, according to one or more embodiments. As shown, the coupled electro-optical package 104 can include the first keystone-shaped metal wire 106 and the second keystone shaped metal wire 108 that can form the enclosure 106/108 of the coupled electro-optical package 104. In some embodiments, the filler material 112 can optionally be disposed between the optical fiber(s) 102 and the enclosure 106/108. An outer metal layer 203 can be disposed about the enclosure 106/108 of the coupled electro-optical package 104.

FIG. 2B depicts an illustrative fiber optic assembly 210 that includes at least one optical fiber 102 (three are shown) in the coupled electro-optical package 104, according to one or more embodiments. As shown, the coupled electro-optical package 104 can include the first and second keystone-shaped metal wires 106 and 108 that can form the enclosure 106/108 of the coupled electro-optical package 104. In some embodiments, the filler material 112 can optionally be disposed between the optical fiber(s) 102 and the enclosure 106/108. One or more layers of helically wound metal strands 212 can be disposed about the enclosure 106/108 of the coupled electro-optical package 104. The outer metal layer 203 can be disposed about the layer(s) of helically wound metal strands 212.

FIG. 2C depicts an illustrative fiber optic assembly 220 that includes at least one optical fiber 102 (three are shown) in the coupled electro-optical package 104, according to one or more embodiments. As shown, the coupled electro-optical package 104 can include the first and second keystone-shaped metal wires 106 and 108 that can form the enclosure 106/108 of the coupled electro-optical package 104. In some embodiments, the filler material 112 can optionally be disposed between the optical fiber(s) 102 and the enclosure

106/108. One or more layers of metallic and/or thermoplastic tape 222 can be disposed about the enclosure 106/108 of the coupled electro-optical package 104. The outer metal layer 203 can be disposed about the layer(s) of metallic and/or thermoplastic tape 222.

FIG. 2D depicts an illustrative fiber optic assembly 230 that includes at least one optical fiber 102 (three are shown) in the coupled electro-optical package 104, according to one or more embodiments. As shown, the coupled electro-optical package 104 can include the first and second keystone-shaped metal wires 106 and 108 that can form the enclosure 106/108 of the coupled electro-optical package 104. In some embodiments, the filler material 112 can optionally be disposed between the optical fiber(s) 102 and the enclosure 106/108. One or more layers of helically wound synthetic fibers 232 can be disposed about the enclosure 106/108 of the coupled electro-optical package 104. The outer metal layer 203 can be disposed about the layer(s) of synthetic fibers 232.

FIG. 2E depicts an illustrative fiber optic assembly 240 that includes at least one optical fiber 102 (three are shown) in the coupled electro-optical package 152, according to one or more embodiments. As shown, the coupled electro-optical package 152 can include the first keystone-shaped metal wire 154, the second keystone-shaped metal wire 156, and the third keystone-shaped metal wire 158 that can form the enclosure 154/156/158 of the coupled electro-optical package 152. In some embodiments, the filler material 112 can optionally be disposed between the optical fiber(s) 102 and the enclosure 154/156/158. The outer metal layer 203 can be disposed about the enclosure 154/156/158 of the coupled electro-optical package 152.

FIG. 2F depicts an illustrative fiber optic assembly 250 that includes at least one optical fiber 102 (three are shown) in the coupled electro-optical package 152, according to one or more embodiments. As shown, the coupled electro-optical package 152 can include the first, second, and third keystone-shaped metal wires 154, 156, and 158 that can form the enclosure 154/156/158 of the coupled electro-optical package 152. In some embodiments, the filler material 112 can optionally be disposed between the optical fiber(s) 102 and the enclosure 154/156/158. One or more layers of the helically wound metal strands 212 can be disposed about the enclosure 154/156/158 of the coupled electro-optical package 152. The outer metal layer 203 can be disposed about the layer(s) the helically wound metal strands 212.

Figure 3:
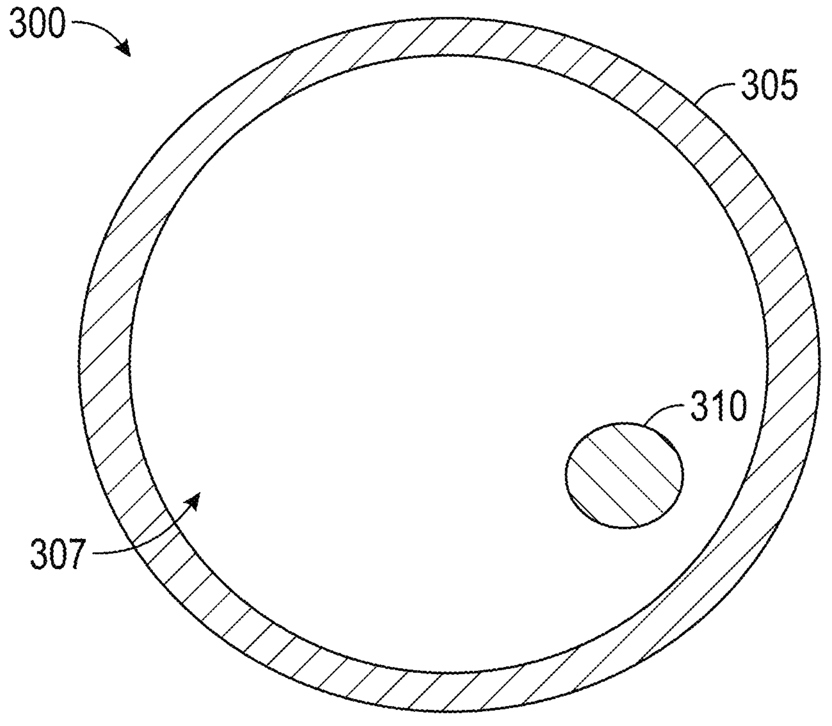
FIG. 3 depicts an illustrative tubing assembly that includes a coiled tubing and any one of the fiber optic assemblies shown in FIGS. 1A-1F and FIGS. 2A-2F, according to one or more embodiments described.

FIG. 3 depicts an illustrative tubing assembly 300 that includes a coiled tubing 305 and any one of the fiber optic assemblies shown in FIGS. 1A-1F and FIGS. 2A-2F that are collectively indicated as 310, according to one or more embodiments. The coiled tubing 305 can define a flow path 307 therethrough. Any one or more of the fiber optic assemblies 100, 120, 130, 140, 150, 160, 200, 210, 220, 230, 240, and 250 (collectively referred to as 310) can be disposed within the flow path 307 defined by the coiled tubing 305. The coiled tubing 305 can be any tubing that can be capable of serving as a conduit for fluids from downhole to up-hole, capable of serving as a conduit for fluids from up-hole to downhole, capable of conveying a downhole tool connected thereto into and out of a wellbore, and/or has any other attributes that are known to be associated with coiled tubing.

In some embodiments, the coiled tubing 305 can be a continuous length of relatively small-diameter pipe and related surface equipment as well as associated drilling, completion, workover, and/or remediation techniques. In other embodiments, the coiled tubing 305 can include two or more separate segments of relatively small-diameter pipe coupled together. The bore 307 defined by the coiled tubing 305 can have an average inner cross-sectional length, e.g., a diameter, of from about 1.9 cm to about 11 cm or 12 cm. In some embodiments, the coiled tubing can have a length of about 600 m to about 9,000 m or 10,000 m.

In some embodiments, the fiber optic assembly 310 disposed within the coiled tubing 305 can be used for one or more distributed measurements such as vibration, acoustics, strain, temperature, and other distributed measurements for oilfield operations. For example, the measurements can include, but are not limited to, distributed vibration sensing (DVS), heterodyne distributed vibration sensing (hDVS), distributed acoustic sensing (DAS), distributed strain and temperature sensing (DSTS), distributed temperature sensing (DTS), or combinations thereof. In some embodiments, the fiber optic assembly 310 can be used for fiber optics telemetry purposes with any oilfield tool(s) for oilfield operations.

In some embodiments, the tubing assembly 300 that includes the coiled tubing 305 and one or more of the fiber optic assemblies 310 disposed therein can be deployed into a well, where fluid from the well or fluid introduced from the surface can be allowed to flow through the flow path 307 of the coiled tubing 305 and about the fiber optic assembly 310 disposed therein. In some embodiments, the conductors in the fiber optic assembly 310, e.g., the enclosure 104 and/or 152, if present the inner layer of helically wound metal strands 122 disposed between the enclosure 104 and the insulation layer 114, and/or, if present the layer of metallic tape 132 disposed between the enclosure 104 and the insulation layer 114, can be used to provide power to downhole tools and/or electrical telemetry. As such, in some embodiments, the fiber optic assemblies 100, 120, 130, 140, 150, and 160 that include the insulation layer 114 can also be referred to as an electro-optical cable or an electro-optical fiber optic assembly because the enclosure 104 and/or 152 and, if present, the inner layer(s) of helically wound metal strands 122 or the optional layer(s) of metallic tape 132 can be configured to carry electricity therethrough.

The present disclosure further relates to any one or more of the following numbered paragraphs:

1. A tubing assembly, comprising: a coiled tubing; and a fiber optic assembly disposed within a flow path of the coiled tubing, wherein the fiber optic assembly comprises: at least one optical fiber in a coupled electro-optical package, wherein the at least one optical fiber is in intimate contact with an enclosure of the coupled electro-optical package; an insulation layer disposed about the enclosure; a layer of helically wound metal strands disposed about the insulation layer; and an outer metal layer disposed about the layer of helically wound metal strands.
2. The tubing assembly according to paragraph 1, wherein the enclosure of the coupled electro-optical package comprises two or more shaped metal wires arranged about the at least one optical fiber.
3. The tubing assembly according to paragraph 2, wherein the two or more shaped metal wires each have a keystone-shaped cross-section.
4. The tubing assembly according to any one of paragraphs 1 to 3, wherein the at least one optical fiber comprises two or more optical fibers that are stranded together in a helix with respect to one another.
5. The tubing assembly according to paragraph 4, wherein an interstitial space located between an outer surface of the two or more optical fibers and an inner surface of the enclosure comprises a filler material disposed therein.

6. The tubing assembly according to paragraph 5, wherein the polymer comprises silicone, ethylene propylene diene monomer rubber, a fluorosilicone, or a mixture thereof.

7. The tubing assembly of according to any one of paragraphs 4 to 6, wherein a length of each of the two or more optical fibers is less than 20 m, less than 15 m, less than 10 m, less than 5 m, less than 1 m, less than 0.5 m, or less than 0.1 m with respect to one another per 9,150 m of the fiber optic assembly.

8. The tubing assembly according to any one of paragraphs 1 to 7, wherein the fiber optic assembly further comprises an inner layer of helically wound metal strands disposed between the enclosure and the insulation layer.

9. The tubing assembly according to any one of paragraphs 1 to 7, wherein the fiber optic assembly further comprises a layer of metallic or thermoplastic tape disposed between the enclosure and the insulation layer.

10. The tubing assembly of any one of paragraphs 1 to 7, wherein the fiber optic assembly further comprises a layer of helically wound synthetic fibers disposed between the enclosure and the insulation layer.

11. The tubing assembly according to paragraph 10, wherein the synthetic fibers comprise glass fibers, ceramic fibers, carbon fibers, aromatic polyamide fibers, aromatic co-polyamide fibers, nylon fibers, polytetrafluoroethylene fibers, or a combination thereof.

12. The tubing assembly according to any one of paragraphs 1 to 11, wherein, if present, a gap between an outer surface of the at least one optical fiber and an inner surface of the enclosure has a length of 0.1016 mm (0.004") or less.

13. A tubing assembly, comprising: a coiled tubing; and a fiber optic assembly disposed within a flow path of the coiled tubing, wherein the fiber optic assembly comprises: at least one optical fiber in a coupled optical package, wherein the at least one optical fiber is in intimate contact with an enclosure of the coupled optical package; and an outer metal layer disposed about the enclosure.

14. The tubing assembly according to paragraph 13, wherein the enclosure of the coupled optical package comprises two or more shaped metal wires arranged about the optical fiber.

15. The tubing assembly according to paragraph 14, wherein the two or more shaped metal wires each have a keystone-shaped cross-section.

16. The tubing assembly according to paragraph 14 or 15, wherein the outer metal layer is adjacent to the enclosure, and wherein an outer radius of each of the two or more shaped metal wires is sufficient to facilitate pressure testing of the outer metal layer.

17. The tubing assembly according to any one of paragraphs 13 to 16, wherein the at least one optical fiber comprises two or more optical fibers that are stranded together in a helix with respect to one another.

18. The tubing assembly according to paragraph 17, wherein an interstitial space located between an outer surface of the two or more optical fibers and an inner surface of the enclosure comprises a filler material disposed therein.

19. The tubing assembly according to paragraph 18, wherein the filler material comprises silicone, ethylene propylene diene monomer rubber, a fluorosilicone, or a mixture thereof.

20. The tubing assembly according to any one of paragraphs 17 to 19, wherein a length of each of the two or more optical fibers is less than 20 m, less than 15 m, less than 10 m, less than 5 m, less than 1 m, less than 0.5 m, or less than 0.1 m with respect to one another per 9,150 m of the fiber optic assembly.

21. The tubing assembly according to any one of paragraphs 13 to 20, wherein the fiber optic assembly further comprises a layer of helically wound metal strands disposed between the enclosure and the outer metal layer.

22. The tubing assembly according to any one of paragraphs 13 to 20, wherein the fiber optic assembly further comprises a layer of metallic or thermoplastic tape disposed between the enclosure and the outer metal layer.

23. The tubing assembly according to any one of paragraphs 13 to 20, wherein the fiber optic assembly further comprises a layer of helically wound synthetic fibers disposed between the enclosure and the outer metal layer.

24. The tubing assembly according to paragraph 23, wherein the synthetic fibers comprise glass fibers, ceramic fibers, carbon fibers, aromatic polyamide fibers, aromatic co-polyamide fibers, nylon fibers, polytetrafluoroethylene fibers, or a combination thereof.

25. The tubing assembly according to any one of paragraphs 13 to 24, wherein, if present, a gap between an outer surface of the at least one optical fiber and an inner surface of the enclosure has a length of 0.1016 mm (0.004") or less.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for [perform]ing [a function] . . . ” or “step for [perform]ing [a function] . . . ”, it is intended that such elements are to be interpreted under 35 U.S.C. 112(f). However, for any claims containing elements designated in any other manner, it is intended that such elements are not to be interpreted under 35 U.S.C. 112(f).

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are “about” or “approximately” the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A tubing assembly, comprising:

a coiled tubing; and a fiber optic assembly disposed within a flow path of the coiled tubing, wherein the fiber optic assembly comprises:

a plurality of optical fibers in a coupled electro-optical package, wherein the plurality of optical fibers are stranded together in direct contact with one another in a helix within an interior of a metal enclosure of the coupled electro-optical package, the plurality of optical fibers are in intimate contact with the metal enclosure of the coupled electro-optical package, and the metal enclosure extends around an entire circumference of the interior having the plurality of optical fibers;

an insulation layer disposed about the metal enclosure;

a layer of helically wound metal strands disposed about the insulation layer; and an outer metal layer disposed about the layer of helically wound metal strands.

2. The tubing assembly of claim 1, wherein the metal enclosure of the coupled electro-optical package comprises two or more shaped metal wires arranged at different circumferential positions and directly contacting one another about the entire circumference of the interior having the plurality of optical fibers, wherein the two or more shaped metal wires each have a keystone-shaped cross-section.

3. The tubing assembly of claim 1, wherein an interstitial space located between an outer surface of the plurality of optical fibers and an inner surface of the metal enclosure comprises a filler material disposed therein, and the filler material and the plurality of optical fibers are the only elements within the interior of the metal enclosure.

4. The tubing assembly of claim 1, wherein a length of each of the plurality of optical fibers is less than 20 m with respect to one another per 9,150 m of the fiber optic assembly.

5. The tubing assembly of claim 1, wherein the fiber optic assembly further comprises an inner layer of helically wound metal strands disposed between the metal enclosure and the insulation layer.

6. The tubing assembly of claim 1, wherein the fiber optic assembly further comprises a layer of metallic or thermoplastic tape disposed between the metal enclosure and the insulation layer.

7. The tubing assembly of claim 1, wherein the fiber optic assembly further comprises a layer of helically wound synthetic fibers disposed between the metal enclosure and the insulation layer.

8. A tubing assembly, comprising:

a coiled tubing; and a fiber optic assembly disposed within a flow path of the coiled tubing, wherein the fiber optic assembly comprises:

a plurality of optical fibers in a coupled optical package, wherein the plurality of optical fibers are the only communication elements within an interior of a metal enclosure of the coupled optical package, the plurality of optical fibers are in intimate contact with the metal enclosure of the coupled optical package, and the metal enclosure extends around an entire circumference of the interior having the plurality of optical fibers; and an outer metal layer disposed about the metal enclosure.

9. The tubing assembly of claim 8, wherein the metal enclosure of the coupled optical package comprises two or more shaped metal wires arranged at different circumferential positions and directly contacting one another about the entire circumference of the interior having the plurality of optical fibers, wherein the two or more shaped metal wires each have a keystone-shaped cross-section.

10. The tubing assembly of claim 8, wherein the plurality of optical fibers are stranded together in direct contact with one another in a helix.

11. The tubing assembly of claim 10, wherein an interstitial space located between an outer surface of the plurality of optical fibers and an inner surface of the metal enclosure comprises a filler material disposed therein, and the filler material and the plurality of optical fibers are the only elements within the interior of the metal enclosure.

12. The tubing assembly of claim 10, wherein a length of each of the plurality of optical fibers is less than 20 m with respect to one another per 9,150 m of the fiber optic assembly.

13. The tubing assembly of claim 8, wherein the fiber optic assembly further comprises a layer of helically wound metal strands disposed between the metal enclosure and the outer metal layer.

14. The tubing assembly of claim 8, wherein the fiber optic assembly further comprises a layer of metallic or thermoplastic tape disposed between the metal enclosure and the outer metal layer.

15. The tubing assembly of claim 8, wherein the fiber optic assembly further comprises a layer of helically wound synthetic fibers disposed between the metal enclosure and the outer metal layer.

16. The tubing assembly of claim 8, wherein, if present, a gap between an outer surface of the plurality of optical fibers and an inner surface of the metal enclosure has a length of 0.1016 mm or less.

17. A tubing assembly, comprising:

a coiled tubing; and a fiber optic assembly disposed within a flow path of the coiled tubing, wherein the fiber optic assembly comprises:

a plurality of optical fibers in a coupled optical package, wherein the plurality of optical fibers are within an interior of a metal enclosure of the coupled optical package, and the metal enclosure extends around an entire circumference of the interior having the plurality of optical fibers; and an outer metal layer disposed about the metal enclosure, wherein the fiber optic assembly further comprises one of:

only one layer disposed directly between the metal enclosure and the outer metal layer, wherein the only one layer comprises helical metal strands, helical synthetic strands, metallic tape, or thermoplastic tape; or only two layers disposed directly between the metal enclosure and the outer metal layer, wherein the only two layers comprise a first layer of insulation disposed directly about the metal enclosure and a second layer of helical metal strands disposed directly about the first layer; or only three layers disposed directly between the metal enclosure and the outer metal layer, wherein the only three layers comprise a first layer of helical metal strands, helical synthetic strands, metallic tape, or thermoplastic tape disposed directly about the metal enclosure, a second layer of insulation disposed directly about the first layer, and a third layer of helical metal strands disposed directly about the second layer.

18. The tubing assembly of claim 17, wherein the fiber optic assembly has the only one layer disposed directly between the metal enclosure and the outer metal layer, wherein the only one layer comprises the helical metal strands, the helical synthetic strands, the metallic tape, or the thermoplastic tape.

19. The tubing assembly of claim 17, wherein the fiber optic assembly has the only two layers disposed directly between the metal enclosure and the outer metal layer, wherein the only two layers comprise the first layer of insulation disposed directly about the metal enclosure and the second layer of the helical metal strands disposed directly about the first layer.

20. The tubing assembly of claim 17, wherein the fiber optic assembly has the only three layers disposed directly between the metal enclosure and the outer metal layer, wherein the only three layers comprise the first layer of the helical metal strands, the helical synthetic strands, the metallic tape, or the thermoplastic tape disposed directly about the metal enclosure, the second layer of the insulation disposed directly about the first layer, and the third layer of the helical metal strands disposed directly about the second layer.

* * * * *